United States Patent [19]

Takamura et al.

[11] Patent Number: 4,777,098
[45] Date of Patent: Oct. 11, 1988

[54] CLAD MATERIAL FOR ORNAMENTAL APPLICATIONS AND A PROCESS FOR PRODUCING THE SAME

[75] Inventors: Masayuki Takamura; Kazuo Kurahashi, both of Hamamatsu, Japan

[73] Assignee: Nippon Gakki Seizo Kabushiki Kaisha, Japan

[21] Appl. No.: 22,565

[22] Filed: Mar. 9, 1987

Related U.S. Application Data

[63] Continuation of Ser. No. 784,825, Oct. 4, 1985, abandoned.

[30] Foreign Application Priority Data

Oct. 8, 1984 [JP] Japan ................... 59-211072
Oct. 12, 1984 [JP] Japan ................... 59-213832

[51] Int. Cl.$^4$ ............................... B32B 15/00
[52] U.S. Cl. ................... 428/664; 428/660; 428/670; 428/672; 428/674; 428/680
[58] Field of Search .......... 428/660, 663, 666, 667, 428/664, 670, 671, 672, 675, 680, 674; 351/41; 72/47

[56] References Cited

U.S. PATENT DOCUMENTS

| | | | |
|---|---|---|---|
| 3,125,805 | 3/1964 | Horigan | 428/660 |
| 3,607,152 | 9/1971 | Hanirk | 428/660 |
| 4,305,998 | 12/1981 | Manby et al. | 428/660 |
| 4,427,746 | 1/1984 | Takamura | 428/660 |
| 4,450,210 | 5/1984 | Takamura et al. | 428/660 |

FOREIGN PATENT DOCUMENTS

| | | | |
|---|---|---|---|
| 71547 | 5/1980 | Japan | 428/672 |
| 755033 | 8/1956 | United Kingdom | 428/660 |
| 755333 | 8/1956 | United Kingdom | 428/660 |
| 797023 | 6/1958 | United Kingdom | 428/666 |

*Primary Examiner*—John J. Zimmerman
*Attorney, Agent, or Firm*—Ostrolenk, Faber, Gerb & Soffen

[57] ABSTRACT

In construction of a Ti core type clad material for ornamental applications presence of one or more intermediate layers made of Cr and/or Mo well deters evolvement of intermetallic compound at the border between core and sheath, thereby significantly improving bonding strength of the product.

11 Claims, 1 Drawing Sheet

CLAD MATERIAL FOR ORNAMENTAL APPLICATIONS AND A PROCESS FOR PRODUCING THE SAME

This is a continuation application of Ser. No. 784,825, filed on Oct. 4, 1985, now abandoned, in the name of Masayuki TAKAMURA and Kazuo KURAHASHI, for CLAD MATERIAL FOR ORNAMENTAL APPLICATIONS AND A PROCESS FOR PRODUCING THE SAME, now abandoned.

BACKGROUND OF THE INVENTION

The present invention relates to a clad material for ornamental applications and a process for producing the same, and more particularly relates to improvement in production of Ti-core clad material for ornamental applications such as eyeglass frames and watch bands.

Ti has been widely used in the field due to its light weight, high rigidity and rich anti-corrosion. Usually for increased aesthetic effect, a Ti core is plated with Au. Dispite troublesome pretreatment, this Au plating cannot assure sufficient bonding strength because of passivity of the Ti core. Thus, due to easy separation of the Au plate, the plated product is unsuited for use in practice.

As a substitute for such a plated product, a Ti-core clad material was proposed in which a Ti core is covered, through cladding, with Au, Au-base alloy, Pt or Pt-base alloy sheath. In this case, however, a big difference in workability between the core and the sheath tends to mar the surface of the sheath during working, thereby disenabling production of high quality clad materials. In addition, direct contact of Ti with Au or Pt tends to evolve fragile inter-metallic compounds near the border between the core and the sheath at plastic deformation and or heat treatment following cladding, which lowers bonding strength between the core and the sheath and inevitably causes separation of the latter.

Another type Ti-core clad material was also proposed in which Ti core is covered, through cladding, with Ni, Ni-base alloy or Cu-base alloy.

Use of such a sheath assures easy brazing of the clad material. Here again inter-metallic compounds are evolved near the border between the core and sheath due to heat at brazing, which lowers brazing strength of the clad material.

In conventional production of such clad materials, hydrostatic extrusion or explosive bonding has generally been employed for cladding. Such conventional cladding, however, cannot provide the products with sufficient bonding strength. Application of heat concurrently with pressure may achieve ideal cladding but causes the problem of inter-metallic compound production.

SUMMARY OF THE INVENTION

It is the object of the present invention to enable production of an easily workable Ti-core clad material with high bonding strength and good fit to brazing.

In accordance with the first aspect of the present invention, a core made of Ti or Ti-base alloy is covered, through cladding, with at least one intermediate layer made of at least one of Cr and Mo, which is in turn covered, through cladding, with a sheath made of Ni, Ni-base alloy, Cu, Cu-base alloy, Au, Au-base alloy, Pt or Pt-base alloy.

In accordance with the second aspect of the present invention, at least one layer made of at least one of Cr and Mo is formed between a core and a sheath prior to cladding of a crude material which is thereafter subjected to pressure at 400° to 900° C. temperature for cladding.

DESCRIPTION OF THE PREFERRED EMBODIMENTS

Figure 1:
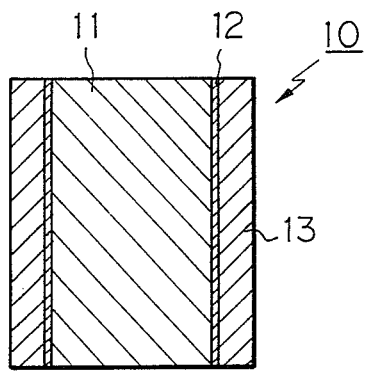
FIG. 1 is a side sectional view of one embodiment of the clad material in accordance with the present invention.

A rod type clad material in accordance with the present invention is shown in FIG. 1, in which the clad material 10 includes a core 11 made of Ti or Ti-base alloy, a thin intermediate layer 12 made of Cr and clad to the core 11, and a sheath 13 made of Ni, Ni-base alloy or Cu-base alloy.

In production of the clad material shown in FIG. 1, a crude core is plated with Cr or covered with Cr foil and the combination is covered with a crude sheath to form the first crude material. Both longitudinal ends of the crude core are covered, through welding, with metal lids made of the same material as the crude sheath to form the second crude material. Next, the second crude material is subjected to a hot isostatic press at a pressure of 0.7 MPa, preferably 10 MPa and more preferably 50 MPa or higher, and at a temperature from 400° to 1000° C., more preferably from 500° to 1000° C., for about one hour to form the first crude product. In the construction of this first crude product, the core, the intermediate layer and the sheath are uniformly clad to each other with high bonding strength as a result of pressure application at high temperature. Thanks to the presence of the Cr intermediate layer which does not evolve any intermetallic compounds, contact by diffusion of Ti with Ni or Cu is effectively barred to avoid evolvement of inter-metallic compounds at the border region.

Next, the metal lids are removed and one end is cut to a conical configuration to form a second crude product which is then processed through a hydrostatic extruder equipped with a conical die to form a third crude product of a reduced diameter. This third crude product is then subjected to wire drawing and heating to obtain a product of a desired diameter. Again during this heating, evolvement of intermetallic compound is deterred by presence of the Cr intermediate layer and, as a consequence, high temperatures are employable for the treatment. Thus, freedom in the choice of heating temperature is remarkably enlarged. As a result, a relatively soft product is obtained which is well suited for free shaping into, for example, eyeglass frames.

The Ti core assures light weight of the product, use of Ni etc makes the product well suited for brazing and the presence of the Cr intermediate layer raises bonding strength of the product. The clad material, as a consequence, is well suited for ornamental applications such as eyeglass frames and watch bands.

As an alternative to Cr, Mo may be used for the intermediate layer also.

Figure 2:
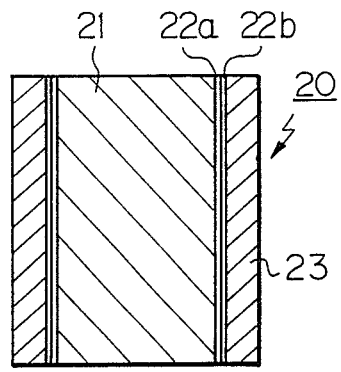
FIG. 2 is a side sectional view of another embodiment of the clad material in accordance with the present invention.

The second embodiment of the clad material in accordance with the present invention is shown in FIG. 2. In this case, a clad material 20 includes a core 21 and a sheath 23 made of materials same as those used for the first embodiment. The clad material 20 further includes the first, i.e. inner, intermediate layer 22a made of Mo and the second, i.e. outer, intermediate layer 22b made of Cr. The materials for the first and second intermediate layers may be reversed.

In one example of production of the clad material shown in FIG. 2, a Ti crude core is covered with Mo and Cr foils and the combination is covered with Cu-base alloy crude sheath to form the first crude material which is processed as in the case of the first embodiment.

In addition to the merits possessed by the first embodiment, Mo in the first intermediate layer easily diffuses into the Ti core to enrich bonding strength between the core and the intermediate layer.

For formation of the intermediate layers, not only foil covering but plating, vacuum evaporation and flame spraying are also employable depending on the demand for production cost.

Figure 3:
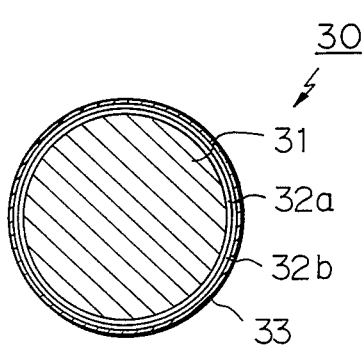
FIG. 3 is a transverse cross-sectional view of the other embodiment of the clad material in accordance with the present invention.

A wire type clad material having a double intermediate construction in accordance with the present invention is shown in FIG. 3. A clad material 30 includes a core 31 made of Ti or Ti-base alloy, the first intermediate layer 32a made of Cr or Cr-base alloy and clad to the core 31, the second intermediate layer 32b made of Ni, Ni-base alloy Cu or Cu-base alloy and clad to the first intermediate layer 32a, and a sheath 33 made of Au, Au-base alloy mainly containing Cu or Pd, Pt or Pt-base alloy and clad to the second intermediate layer 32a.

The clad material shown in FIG. 3 is produced in a manner substantially the same as those of the foregoing embodiments except for choice of material combination.

Use of precious metal for the sheath makes the product well suited for plating and rises aesthetic value of the product.

Figure 4:
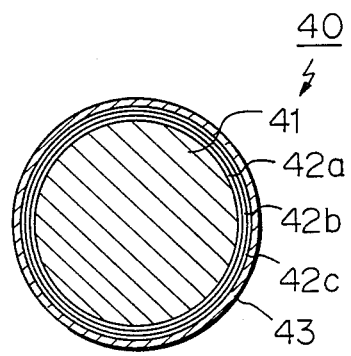
FIG. 4 is a transverse cross-sectional view of a further embodiment of the clad material in accordance with the present invention.

The fourth embodiment of the clad material shown in FIG. 4 has three intermediate layers. That is, in addition to a core 41 and a sheath 43, both made of the same materials as described above, a clad material 40 includes the first intermediate layer 42a made of Mo or Mo-base alloy and clad to the core 41, the second intermediate layer 42b made of Cr or Cr-base alloy and clad to the first intermediate layer 42a, and the third intermediate layer 42c made of Ni, Ni-base alloy, Cu or Cu-base alloy and clad to the second intermediate layer 42b. The materials for the first and second intermediate layers may be reversed.

In the case of this embodiment, Mo in the first intermediate layer 42a performs full solid solution at cladding into the Ti in the core 41 and Cr in the second intermediate layer 42b thereby greatly enriching bonding strength between these layers.

Ti-base alloy used for the core of this invention contains 50% by weight or more of Ti and, in balance, at least one of Al, Mo, V, Zr, Sn, Pd, Cr, Cu, and Ni.

Ni-base alloy used for the sheath or intermediate layer of this invention containe 50% by weight or more of Ni and, in balance, at least one of Al, Mo, V, Zr, Sn, Pd, Cr, Cu, and Ti.

Cu-base alloy used for the sheath or intermediate layer of this invention also contains 50% by weight or more of Cu and, in balance, at least one of Al, Mo, V, Zr, Sn, Pd, Cr, Ni, and Ti.

The thickness of the Cr or Mo layer finally obtained should preferably be in a range from 0.5 to 30μ.

EXAMPLES

Example 1

For comparison purposes, a clad material without any intermediate layer was prepared as follows. A Ti rod of 54 mm outer diameter and 980 mm length was fitted into a Ni pipe of 60 mm outer diameter, 2.5 mm thickness and 1000 mm length and Ni lids were fixed to both ends via electron beam welding. The combination was subjected to hot isostatic press at 300° to 1000° C. temperature and 100 MPa pressure for one hour.

After removal of the end lids, one end was shaped into a conical configuration in order to obtain a rod of 32 mm diameter by hydrostatic extrusion.

The rod was then subjected to drawing to obtain a thin rod of 8 mm diameter which was processed to annealing after heating at 500° C. for 20 min. A wire of 3 mm diameter obtained by wire drawing was again subjected to annealing after heating at 500° C. for 10 min to produce a blank sample.

For measurement of bonding strength, the blank sample was subjected to torsion test. Chuck distance was 50 times as large as the diameter and the sample was twisted 20 times in one direction and 20 times in the other direction.

One clad material in accordance with the present invention was prepared by interposing a Cr foil of 1 μm thickness between a like Ni pipe and a like Ti rod.

Another clad material in accordance with the present invention was prepared by interposing a Mo foil of 3 μm thickness and a Cr foil of 1 to 3 μm thickness between a like Ni pipe and a like Ti rod.

These samples of the present invention were processed and tested in a same way as the blank sample. For each sample, different temperatures were employed at the hot isostatic press and the results are shown in Tables 1A and 1B.

TABLE 1A

| Sample No. | Intermediate layer | | | | Temperature in °C. Pressure in atm |
|---|---|---|---|---|---|
| | Second | | First | | |
| | Material | Thickness in μm | Material | Thickness in μm | |
| 1 | — | — | — | — | 400 / 1000 |
| 2 | — | — | — | — | 600 / 1000 |
| 3 | — | — | — | — | 900 / 1000 |
| 4 | Cr | 1 | — | — | 300 / 1000 |
| 5 | Cr | 1 | — | — | 600 / 1000 |
| 6 | Cr | 1 | — | — | 900 / 1000 |
| 7 | Cr | 1 | — | — | 950 / 1000 |
| 8 | Cr | 1 | Mo | 3 | 700 / 1000 |
| 9 | Cr | 1 | Mo | 3 | 900 / 1000 |
| 10 | Cr | 1 | Mo | 3 | 1000 / 1000 |
| 11 | Cr | 1 | Mo | 3 | 1050 / 1000 |
| 12 | Cr | 2 | Mo | 3 | 1600 |

TABLE 1A-continued

| Sample No. | Intermediate layer | | | | Temperature in °C. Pressure in atm |
|---|---|---|---|---|---|
| | Second | | First | | |
| | Material | Thickness in μm | Material | Thickness in μm | |
| 13 | Cr | 3 | Mo | 3 | 1000 1000 1000 |

TABLE 1B

| Sample No | Torsion test | State of surface and border | Remarks |
|---|---|---|---|
| 1 | X | No bonding | Separation by 1 twist. |
| 2 | Δ | Compound of aprx. 2.0 μm | Separation by 11 twists |
| 3 | X | Compound of a great deal | Separation by 2 twists |
| 4 | X | No bonding | Separation by 1 twist |
| 5 | o | good, diffusion of aprx. 0.1 μm | |
| 6 | o | good, diffusion of aprx. 0.5 μm | |
| 7 | Δ | Cr disappear Ti—Ni compound evolved | Separation by 12 twists |
| 8 | o | Good | |
| 9 | o | Good | |
| 10 | Δ | Cr disappear Mo full solid solution in Ti | Separation by 13 twists |
| 11 | X | Ti—Ni compound aprx. 2~3 μm | Separation by 7 twists |
| 12 | Δ | | Separation by 15 twists |
| 13 | Δ | | Separation by 17 twists | o Good bonding
Δ Separation by 10 or more twists
X Separation by less than 10 twists Data in Tables 1A and 1B clearly indicate that presence of the intermediate layer or layers and choice of heating temperature in a range from 600° to 900° C. concur to enable production of a clad material with high bonding strength. Any temperature above 1000° promotes diffusion of Cr or Cr with Mo and causes disappearance of the intermediate layer or layers. This inevitably connects to evolvement of intermetallic compounds during heating after cladding and/or at brazing.

Example 2

Various samples were prepared as shown in Tables 2A and 2B and subjected to torsion test.

For example, preparation of the sample including a Ti core, a Cr intermediate layer, a Ni intermediate layer and a Au sheath was carried out as follows. A Cr foil of 20 μm thickness and a Ni foil of 50 μm thickness were applied in the described order to a Ti rod of 20 mm outer diameter and 400 mm length. The combination was fitted into a Au pipe (12 grade) of 0.3 mm thickness and both ends were closed by welded metal lids. The combination was subjected to hot isostatic press for one hour at one of the temperatures enlisted in the Tables. Next, the combination were subjected to repeated cold drawing (75% rate of working) and annealing (at 800° C. for 30 min in Ar gas followed by slow cooling) to obtain a wire of 3 mm diameter. The wire was then subjected to finish annealing (at 600° C. for 20 min followed by slow cooling). Torsion test was carried out in a manner same as that in Example 1.

TABLE 2A

| Sample No. | Intermediate layer | | | | | |
|---|---|---|---|---|---|---|
| | Third | | Second | | First | |
| | Material | Thickness in μm | Material | Thickness in μm | Material | Thickness in μm |
| 14 | — | — | — | — | — | — |
| 15 | — | — | — | — | — | — |
| 16 | — | — | — | — | Ni | 5 |
| 17 | — | — | — | — | Ni | 5 |
| 18 | Ni | 5 | Cr | 2 | — | — |
| 19 | Ni | 5 | Cr | 2 | — | — |
| 20 | Ni | 5 | Cr | 2 | — | — |
| 21 | Ni | 5 | Cr | 2 | — | — |
| 22 | Ni | 5 | Cr | 2 | Mo | 2 |
| 23 | Ni | 5 | Cr | 2 | Mo | 2 |
| 24 | Ni | 5 | Cr | 2 | Mo | 2 |
| 25 | Ni | 5 | Cr | 2 | Mo | 2 |
| 26 | Ni | 5 | Cr | 2 | Mo | 2 |

TABLE 2B

| Sample No | Temperature in °C. at hot isostatic press | Torsion test | State of surface and border |
|---|---|---|---|
| 14 | 600 | X | compound evolved |
| 15 | 800 | X | Compound evolved |
| 16 | 600 | Δ | |
| 17 | 800 | X | Compound evolved |
| 18 | 300 | X | |
| 19 | 600 | o | |
| 20 | 800 | o | |
| 21 | 950 | Δ | Cr disappear |
| 22 | 400 | o | |
| 23 | 600 | o | |
| 24 | 900 | o | |
| 25 | 950 | o | |
| 26 | 1000 | Δ | | o Good bonding
Δ Separation by 10 or more twists
X Separation by less than 10 twists It is clear from the enlisted data that good results were obtained with Samples Nos. 18~25 in accordance with the present invention. Forward separation with Sample 18 shows the fact that heating temperature at hot isostatic press should be higher than 300° C., more preferably 400° C. or higher.

We claim:

1. A clad metal for ornamental applications comprising:
   a core made of a material selected from the group consisting of Ti and Ti-base alloy;
   an intermediate layer predominantly containing a material selected from the group consisting of Cr and Mo, the thickness of said intermediate layer being in a range from 0.5 to 30 μm; and
   a sheath made of a material selected from the group consisting of Ni, Ni-base alloy, Cu, Cu-base alloy, Au, Au-base alloy, Pt and Pt-base alloy, said sheath being high temperature clad to said intermediate layer.

2. A clad material as claimed in claim 1 in which said intermediate layer is made of a material selected from the group consisting of Cr and Cr-base alloy.

3. A clad material as claimed in claim 1 in which said intermediate layer is made of a material selected from the group consisting of Mo and Mo-base alloy.

4. A clad material as claimed in claim 1 in which said intermediate layer is comprised of two layers, a first layer made of a material selected from the group consisting of Cr and Cr-base alloy and a second layer made of a material selected from the group consisting of Mo and Mo-base alloy.

5. A clad material as claimed in claim 1 in which
said intermediate layer is a first intermediate layer adjacent said core and is made of a material selected from the group consisting of Cr, Cr-base alloy, Mo and Mo-base alloy; and
said clad material further having a second intermediate layer adjacent said first intermediate layer and is made of a material selected from the group consisting of Ni, Ni-base alloy, Cu and Cu-base alloy.

6. A clad material as claimed in claim 1 in which:
said intermediate layer is comprised of a first layer adjacent said core and made of a material selected from the group consisting of Cr and Cr-base alloy and a second layer adjacent said first layer and made of a material selected from the group consisting of Mo and Mo-base alloy; and
said clad material further comprising a third layer adjacent said second layer and made of a material selected from the group consisting of Ni, Ni-base alloy, Cu and Cu-base alloy.

7. A clad material as claimed in claim 1 in which:
a first intermediate layer adjacent said core is made of a material selected from the group consisting of Mo and Mo-base alloy;
a second intermediate layer adjacent said first intermediate layer is made of a material selected from the group consisting of Cr and Cr-base alloy;
a third intermediate layer adjacent said second intermediate layer is made of a material selected from the group consisting of Ni, Ni-base alloy, Cu and Cu-base alloy; and
said first and second intermediate layers having a total thickness in a range from 0.5 to 30 $\mu$m.

8. A clad material as claimed in claim 1 in which said intermediate layer and said sheath are clad under pressure at 400° to 900° C.

9. A process for producing a clad material for ornamental applications comprising the steps of:
covering a core made of Ti or Ti-base alloy with a 0.5 to 30 $\mu$m layer predominantly containing a material selected from the group consisting of at least one of Cr and Mo to form a first crude material,
covering said first crude material with a sheath made of a material selected from the group consisting of Ni, Ni-base alloy, Cu, Cu-base alloy, Au, Au-base alloy, Pt and Pt-base alloy to form a second crude material; and
subjecting said second crude material to pressure at 400° to 900° C. for cladding.

10. A clad material for ornamental applications, comprising:
a core made of a material selected from the group consisting of Ti and Ti-base alloy;
a plurality of intermediate layers;
a sheath made of a material selected from the group consisting of Ni, Ni-base alloy, Cu, Cu-base alloy, Au, Au-base alloy, Pt and Pt-base alloy and clad to the outermost of said intermediate layers; and
wherein said plurality of intermediate layers comprises a first intermediate layer made of a material selected from the group consisting of Mo and Mo-base alloy and is clad to said core and a second intermediate layer made of a material selected from the group consisting of Cr and Cr-base alloy and is clad to said first intermediate layer; and
said first and second intermediate layers having a total thickness in a range from 0.5 to 30 $\mu$m.

11. A clad material as claimed in claim 10 in which said plurality of intermediate layers further comprises a third intermediate layer made of a material selected from the group consisting of Ni, Ni-base alloy, Cu or Cu-base alloy and is clad to said second intermediate layer.

* * * * *